United States Patent
Aggarwal et al.

(10) Patent No.: US 8,953,590 B1
(45) Date of Patent: Feb. 10, 2015

(54) LAYER TWO VIRTUAL PRIVATE NETWORK HAVING CONTROL PLANE ADDRESS LEARNING SUPPORTING MULTI-HOMED CUSTOMER NETWORKS

(75) Inventors: Rahul Aggarwal, Menlo Park, CA (US); Ravi Shekhar, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 405 days.

(21) Appl. No.: 13/427,698

(22) Filed: Mar. 22, 2012

Related U.S. Application Data

(60) Provisional application No. 61/466,838, filed on Mar. 23, 2011.

(51) Int. Cl.
*H04L 12/46* (2006.01)
(52) U.S. Cl.
CPC .................... *H04L 12/4675* (2013.01)
USPC ............. 370/389; 370/401; 370/409
(58) Field of Classification Search
CPC .................... H04L 12/4641–12/4695
USPC .................. 370/389–392, 400, 401, 408, 409
See application file for complete search history.

(56) References Cited

U.S. PATENT DOCUMENTS

| | | |
|---|---|---|
| 7,095,738 B1 | 8/2006 | Desanti |
| 7,184,437 B1 | 2/2007 | Cole et al. |
| 7,221,675 B2 | 5/2007 | Bryden et al. |
| 7,286,479 B2 | 10/2007 | Bragg |
| 7,359,989 B2 | 4/2008 | Orava et al. |
| 7,856,509 B1 | 12/2010 | Kodeboyina |
| 8,151,000 B1 | 4/2012 | Kodeboyina |
| 2004/0165600 A1 | 8/2004 | Lee |
| 2004/0196827 A1 | 10/2004 | Xu et al. |
| 2004/0218539 A1 | 11/2004 | Anqud et al. |
| 2004/0223500 A1 | 11/2004 | Sanderson et al. |
| 2005/0044262 A1 | 2/2005 | Luo |
| 2005/0213513 A1 | 9/2005 | Ngo et al. |
| 2008/0044181 A1 | 2/2008 | Sindhu |
| 2011/0286452 A1* | 11/2011 | Balus et al. ............. 370/390 |

OTHER PUBLICATIONS

Kompella et al. "Virtual Private LAN Services over MPLS," draft-ietf-ppvpn-vpls-ldp-00.tx, Jun. 2003, 26 pp.
"Junos OS for EX Series Ethernet Switches, Release 11.4: Spanning-Tree Protocols", Revision 2, Juniper Networks, Inc. Nov. 23, 2011, 172 pgs.
Rosen et al. "BGP/MPLS IP Virtual Private Networks (VPNs)", Network Working Group, RFC 4364, The Internet Society, Feb. 2006, 47 pgs, available at available at http://tools.ietf.org/html/rfc4364, accessed Mar. 22, 2012.

(Continued)

*Primary Examiner* — Pao Sinkantarakorn
(74) *Attorney, Agent, or Firm* — Shumaker & Sieffert, P.A.

(57) ABSTRACT

This disclosure describes techniques for supporting an and Multi-Protocol Label Switching (MPLS)-based Virutal Private Network (VPN) service that provides layer two (L2) connectivity between the customer edge device. In particular, the techniques support a Border Gateway (BGP) MPLS-based MAC VPNs ("MAC-VPN" or "MAC VPN"). The techniques provide a MAC VPN in which L2 MAC address learning occurs in the control plane via inter-device BGP signaling in the control plane rather than the data plane, in response to VPN traffic, as may be typical with other VPN technologies.

24 Claims, 7 Drawing Sheets

(56) References Cited

OTHER PUBLICATIONS

Andersson et al. "Provider Provisioned Virtual Private Network (VPN) Terminology", Network Working Group, RFC 4026, The Internet Society, Mar. 2005, 20 pgs, available at http://tools.ietf.org/html/rfc4026, accessed Mar. 22, 2012.

Rosen et al. "Multicast in MPLS/BGP IP VPNs", Network Working Group, Internet Draft, DRAFT-IETF-L3VPN-2547BIS-MCAST-10, Jan. 28, 2010, 89 pgs, available at http://tools.ietf.org/html/draft-ietf-l3vpn-2547bis-mcast-10, accessed Mar. 22, 2012.

Kompella et al. "Virtual Private LAN Service", Network Working Group, Internet-Draft, draft-ietf-l2vpn-vpls-bgp-05, Apr. 8, 2005, 28 pgs., available at http://tools.ietf.org/html/draft-ietf-l2vpn-vpls-bgp-05, accessed Mar. 22, 2012.

Kompella et al. "Multi-homing in BGP-based Virtual Private LAN Service", Network Working Group, Internet-Draft, draft-kompella-l2vpn-vpls-multihoming-02.txt, Nov. 3, 2008, 28 pgs, available at http://tools.ietf.org/html/draft-kompella-l2vpn-vpls-multihoming-02, accessed Mar. 22, 2012.

Martini et al. "Inter-Chassis Communication Protocol for L2VPN PE Redundancy" Internet Engineering Task Force, Internet Draft, draft-ietf-pwe3-iccp-04.txt, Oct. 13, 2010, 78 pgs, http://tools.ietf.org/html/draft-ietf-pwe3-iccp-04, accessed Mar. 22, 2012.

Bates et al. "Multiprotocol Extensions for BGP-4", Network Working Group, RFC 4760, The Internet Society, Jan. 2007, 12 pgs, available at http://www.ietf.org/rfc/rfc4760.txt, accessed Mar. 22, 2012.

U.S. Appl. No. 11/212,509, filed Aug. 26, 2005, entitled "Aggregate Multicast Trees for Multicast Virtual Private Networks,".

Aggarwal et al. "Multicast in VPLS", Network Working Group, Internet Draft, draft-ietf-12vpn-vpls-mcase-04.txt, Jun. 2, 2008, 42 pgs, http://tools.ietf.org/html/draft-ietf-l2vpn-vpls-mcast-04.

Aggarwal et al. "BGP MPLS Based MAC VPN" Network Working Group, Internet Draft, draft-raggarwa-mac-vpn-01, Jun. 2, 2010, 31 pgs, available at http://tools.ietf.org/pdf/draft-raggarwa-mac-vpn-01.pdf, accessed Mar. 22, 2012.

Aggarwal et al. "BGP MPLS Based MAC VPN", Network Working Group, Internet Draft, draft-raggarwa-mac-vpn-00.txt, Mar. 26, 2010, 23 pgs, available at http://tools.ietf.org/pdf/draft-raggarwa-mac-vpn-00.pdf, accessed Mar. 22, 2012.

U.S. Appl. No. 12/973,559, filed Dec. 20, 2010, entitled "Transparently Providing Layer Two (L2) Services Across Intermediate Computer Networks".

Final Office Action from U.S. Appl. No. 13/437,524, dated Apr. 18, 2014, 10 pp.

* cited by examiner

LAYER TWO VIRTUAL PRIVATE NETWORK HAVING CONTROL PLANE ADDRESS LEARNING SUPPORTING MULTI-HOMED CUSTOMER NETWORKS

This application claims the benefit us U.S. Provisional Patent Application Ser. No. 61/466,838, filed Mar. 23, 2011, incorporated herein by reference.

BACKGROUND

Technical Field

A computer network is a collection of interconnected computing devices that exchange data and share resources. In a packet-based network, such as the Internet, the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

A private network may include a number of devices, such as computers, owned or administered by a single enterprise. These devices may be grouped into a number of site networks, which in turn may be geographically distributed over a wide area. Each site network may include one or more local area networks (LANs). Virtual private networks (VPNs) are often used to securely share data between site networks over a public network, such as the Internet. As one example, VPNs encapsulate and transport layer three (L3) communications, such as Internet Protocol (IP) packets, between the remote sites via the public network.

One form of a VPN is generally referred to as "BGP MPLS VPN" in which the Border Gateway Protocol (BGP) is used as a signaling protocol to establish the VPN and Multi-Protocol Label Switching (MPLS) is used as a transport mechanism to carry the L3 communications. When a BGP MPLS VPN is established within a network, devices for the VPN each include VPN-specific virtual routing and forwarding (VRF) tables. Routers involved in VPN-communications for an enterprise (e.g., provider edge (PE) routers or routers at the edge of a service provider network) maintain distinct VRF tables for each customer VPN, thereby providing a degree of logical isolation of routing and forwarding information for each different VPN. Additional details regarding VPNs, specifically VPNs implemented using BGP and MPLS are discussed in E. Rosen and Y. Rekhter, "BGP/MPLS IP Virtual Private Networks (VPNs)," RFC 4364, February 2006, available at http://tools.ietf.org/html/rfc4364, and L. Andersson and T. Madsen, "Provider Provisioned Virtual Private Network (VPN) Terminology," RFC 4026, March 2005, available at http://tools.ietf.org/html/rfc4026, the entire contents of each of which are incorporated herein by reference.

In some cases, a VPN may be configured to carry L3 multicast traffic, such as Internet Protocol Television (IPTV), desktop conferences, corporate broadcasts, music and video web cases, and other forms of multimedia content. If a particular BGP/MPLS IP VPN is transmitting "native" multicast traffic over the backbone, it is referred to as a Multicast VPN (MVPN). "Native" multicast traffic typically refers to packets that a customer edge (CE) router sends to a provider edge (PE) router in which the IP destination address of the packets is a multicast group address, or the packets are multicast control packets (e.g., join messages) addressed to the PE router itself, or the packets are IP multicast data packets encapsulated in MPLS. Further details of MVPNs are described in Internet Engineering Task Force, "Multicast in MPLS/BGP IP VPNs," Internet Draft, DRAFT-IETF-L3VPN-2547BIS-MCAST-10, Jan. 28, 2010, available at http://tools.ietf.org/html/draft-ietf-l3vpn-2547bis-mcast-10, the entire content of which is incorporated herein by reference.

SUMMARY

In general, this disclosure describes techniques for supporting an MPLS-based VPN service that provides layer two (L2) connectivity between the customer edge device. In particular, this disclosure describes techniques for supporting a BGP MPLS-based MAC VPNs ("MAC-VPN" or "MAC VPN"). The techniques provide a MAC VPN in which L2 MAC address learning occurs in the control plane via inter-device signaling rather than the data plane, in response to VPN traffic, as may be typical with other VPN technologies. In one example, the Border Gateway Protocol (BGP) is used as a control plane signaling protocol between devices providing the MAC VPN.

The techniques may provide certain features, such as the support of multiple active points of attachment for a customer equipment ("CE") which may be a host, switch or router. Current MPLS VPN technologies, such as the Virtual Private LAN Service (VPLS), are typically unable to support active-active arrangements for L2 connectivity with a CE device. The techniques described herein allows load-balancing among multiple active paths. Regular Ethernet switching technologies, based on MAC learning typically do not allow the same MAC address to be learned from two different service provider edge routers (PEs), where the learned MAC address is active at the same time in the same switching instance. The techniques described herein address these issues and provide multi-homed, active-active L2 VPN connectivity.

In addition, the techniques may provide the ability for constructing a VPN in which a single VLAN, i.e., a single L2 VPN switching instance having a common L2 learning space, spans across multiple racks in different geographic locations, possibly in multiple data centers. The techniques may provide an ability to scale up to hundreds of thousands of hosts or more across multiple data centers, where connectivity is required between hosts in different data centers.

As additional examples, the techniques may minimize or eliminate flooding of unknown unicast traffic within the network. The techniques may also support virtualization within a VPN by allowing hosts and Virtual Machines (VMs) supporting the L2 VPN (e.g., within a data center or multiple data centers) to relocate without requiring renumbering or read-dressing. This may allow VMs to easily be moved within a VPN for load or failure reasons. This may also provide the ability to separate groups of hosts and VMs working together from other such groups, and the ability to have overlapping IP and MAC addresses.

In one example, a method comprises receiving, at a first multi-protocol label switching (MPLS) edge switch, a layer two (L2) communication from a first one of a plurality of customer networks via an attachment circuit coupling the first MPLS edge switch to the first one of the plurality of customer networks. The L2 communication includes a media access control (MAC) address for a customer device within the first customer network, wherein the first MPLS edge switch is one of a plurality of the first MPLS edge switches that provide a layer two (L2) virtual private network (VPN) through a provider network for the plurality of customer networks. The first one of the customer networks is coupled to a second one of the MPLS edge switches of the VPN by a second attachment circuit that forms a multi-homed, Ethernet segment with the first attachment circuit. The method further comprises outputting a control plane routing protocol message from the first MPLS edge switch to at least one other MPLS edge switch within the provider network, wherein the routing protocol message announces the MAC address of the customer device and an identifier for the Ethernet segment on which the L2 communication was received.

In another example, a multi-protocol label switching (MPLS) edge switch comprises a first interface that couples the MPLS edge switch to an attachment circuit of a first one of a plurality of customer networks, wherein the attachment circuit carries an layer two (L2) communication that includes a media access control (MAC) address for a customer device within the first customer network, and wherein the attachment circuit is one of a plurality of attachment circuits that forms an active-active, multi-homed Ethernet segment that connects the customer network to a service provider network. A second interface couples the MPLS edge switch to the service provider network having a plurality of remote MPLS edge switches that provide an L2 virtual private network (VPN) for the customer network. A control unit comprises a processor programmed to output a routing protocol message from the MPLS edge switch to the remote MPLS edge switches within the provider network, wherein the routing protocol message announces the MAC address of the customer device and an identifier for the Ethernet segment on which the L2 communication was received. A switching element programmed to switch L2 communications between the attachment circuit of the network device and the L2 VPN of the service provider network.

The details of one or more examples are set forth in the accompanying drawings and the description below. Other features, objects, and advantages will be apparent from the description and drawings, and from the claims.

DETAILED DESCRIPTION

Figure 1:
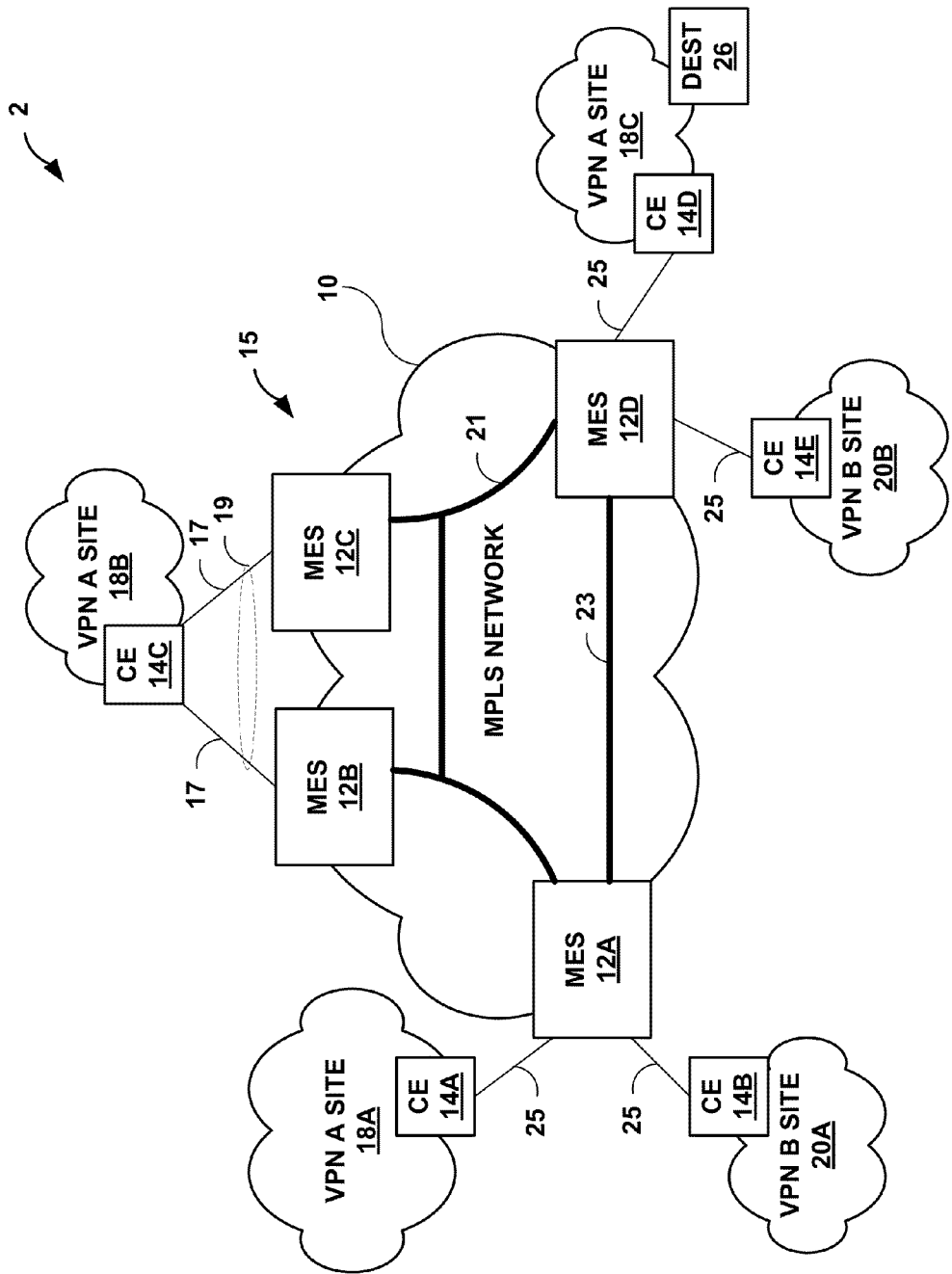
FIG. 1 is a block diagram illustrating an example computer network in which provider edge (PE) routers (also referred to as MPLS Edge Switches—"MESes") support BGP MPLS-based MAC VPNs.

FIG. 1 is a block diagram illustrating an example BGP MPLS based MAC VPNs ("MAC-VPN"). The example computer network 2 includes a service provider network 10 in which provider edge (PE) routers 12A-12C ("PE routers 12") provide an intermediate MPLS network 15 between customer edge routers (CEs) 14. In the illustrated embodiment, CEs 14 are connected to MESes 12, also referred to as MPLS Edge Switches ("MESes 12"), that form the edge of the MPLS network 15. Each of CEs 14 may be a host, a router or a switch. MESes 12 operate as MPLS Edge Switches to provide layer 2 (L2) virtual bridge connectivity between CEs 14.

As shown in FIG. 1, service provider network 10 may provide multiple MAC VPNs to different customers. For example, service provider network 10 may provide a first MAC VPN 21 for a first customer having a sites located at VPN A SITE 18A, 18B and 18C. Service provider network 10 may provide a second MAC VPN 23 for a second customer having a sites located at VPN A SITE 18A, 18B and 18C. Each of MESes 12 may include a MAC VPN routing and forwarding instance, also referred to as a MAC VPN Instance (MVI), to provide L2 connectivity for each MAC VPN.

MPLS network 15 provides an MPLS LSP infrastructure which provides the benefits of MPLS, such as fast-reroute, resiliency and the like. For each MAC VPN, MAC learning between MESes 12 occurs not in the data plane (as typically happens with traditional bridging) but in a control plane (e.g., a routing engine) of each of MESes 12 using, for example, a routing protocol such as the Border Gateway Protocol. Control plane learning may offer greater control over the learning process, such as restricting which learns which L2 MAC address and the ability to more easily apply policies. In one embodiment, the control planes of PE 12 utilize enhanced BGP routing protocol messages to communicate MAC addresses and other information for supporting the MAC VPN. Use of BGP may provide much greater scale, and the ability to "virtualize" or isolate groups of interacting agents (hosts, servers, Virtual Machines) from each other.

MESes 12 utilize BGP routing protocol messages to advertise MAC addresses learned from CEs 14 to which they are connected, along with a MPLS label, to other MESes. Control plane learning via BGP routing protocol messages enables load balancing and allows CEs 14 to connect to multiple active points of attachment. It may also improve convergence times within MPLS network 10 in the event of certain network failures. However, learning between MESes 12 and CEs 14 may be performed by any method best suited to the CE: data plane learning, IEEE 802.1x, LLDP, 802.1aq or other protocols.

It may be a local decision as to whether a Layer 2 forwarding table (e.g., a MAC table) on a given MES 12 for a switching instance (e.g., VLAN) contains all the MAC destinations known to the control plane or implements a cache based scheme. For instance, the forwarding table within a data plane of a specific one of MESes 12 may be populated only with the MAC destinations of the active flows transiting the MES. Each of MAC-VPN instances 21, 23 within computer network 2 may associated with a respective Route-Distinguisher (RD) and one or more Route-Targets (RTs), and the RD and RTs are specified within the BGP routing protocol messages to identify the corresponding MAC VPNs 21, 23.

Each of CEs 14 may attach to a MAC-VPN 21, 23 on a MES 14 in a particular MAC VPN Instance (MVI) over a VLAN via an Ethernet interface. When the point of attachment is a VLAN, there may be one or more VLANs in a particular MAC-VPN 21, 23. Some deployment scenarios may guarantee uniqueness of VLANs across MAC-VPNs, i.e., that all points of attachment of a given MAC VPN use the same VLAN and no other MAC VPN uses this VLAN. This case is referred to herein as a "Default Single VLAN MAC-VPN." Simplified procedures to optimize for this case are described herein.

As shown in FIG. 1, CE 14C is multi-homed to two MESes 12B, 12C. In this example, the set of multiple attachment circuits 17 constitutes an Ethernet segment 19. Ethernet segment 19 may appear to CE 14C as a Link Aggregation Group (LAG). Moreover, MESes 12B, 12C may form a multi-chassis LAG in which attachment circuits 17 provide CE 14C with redundant connectivity to different network devices, i.e. MESes 12B, 12C.

As described herein, an identifier referred to as "Ethernet Segment Identifier" (ESI) is assigned to identify Ethernet segment 19 having multiple attachment circuits 17. A single-homed CE (e.g., CEs 14A, 14B, 14D and 14E coupled to attachment circuits 25) may be considered to be attached to an Ethernet segment having an ESI of zero (0). Otherwise, each Ethernet segment having multiple attachment circuits is assigned a unique non-zero ESI.

The ESI can be assigned using various mechanisms. As one example, the ESI may be configured manually or discovered automatically. For instance when MAC VPNs are used to provide a VPLS service, the VE ID for a BGP VPLS may be used for the ESI or the Multi-homing site ID may be used. Example details of assigning a VE ID in a BGP VPLS environment are found in RFC 4761, "Virtual Private LAN Service," Kompella et al., IETF draft-ietf-l2vpn-vpls-bgp-05, Apr. 8, 2005, the entire contents of which are incorporated by reference herein. Further example details of VPLS are described in Kompella, K., et al., "Multi-homing in BGP-based Virtual Private LAN Service," Nov. 3, 2008, Internet Draft, updates RFC 4761, the entire contents of which are incorporated by reference herein.

As a second example, each of CE 14C and MESes 12B, 12C optionally execute the Link Aggregation Control Protocol (LACP) to bundle interfaces associated with attachment circuits 17 and treat the bundle as a single logical interface in terms of L2 forwarding. That is, CE 14 associates attachment circuits 17 with a single logical interface for purposes of L2 forwarding to utilize the links in parallel to load-balance L2 traffic to increase the link speed beyond the limits of any one single cable or port and/or to increase the redundancy for higher availability. If LACP is used between the MESes 12 and CEs 14 that are hosts, then the ESI can be determined by LACP using one or more attributes associated with the link aggregation group. For example, the ESI may be assigned as the 48 bit virtual MAC address of the host for the LACP link bundle. As far as the host is concerned, it would treat the multiple MESes to which it is homed to as the same switch. This allows the host to aggregate links to different MESes in the same bundle. Example details on an LACP can be found in IEEE 802.3ad, Aggregation of Multiple Link Segments, the contents of which are incorporated herein by reference. MESes 12B, 12C may utilize an inter-chassis communication protocol (ICCP) to establish inter-chassis communications 25 and control forwarding with respect to Ethernet segment 19 for reaching CE 14C. Example details on an ICCP can be found in Martini et al., "Inter-Chassis Communication Protocol for L2VPN PE Redundancy," IETF, Oct. 13, 2010, the contents of which are incorporated herein by reference.

As a third example, a Link Layer Discovery Protocol (LLDP) may be used between MESes 12B, 12C and CE 14C that are hosts, then the ESI can be determined by LLDP. In the case of indirectly connected hosts and a bridged LAN between the hosts and the MESes, the ESI can be determined based on the Layer 2 bridge protocol. For example, if a Spanning Tree Protocol (STP) is used then the value of the ESI can be derived by listening to bridge protocol data units (BPDUs) on the Ethernet segment. For example, the MES may execute any of the Spanning-Tree Protocol (STP), Rapid Spanning-Tree Protocol (RSTP), Multiple Spanning-Tree Protocol (MSTP), and VLAN Spanning-Tree Protocol (VSTP). The MES need not execute the STP and participate in the protocol within the layer two network. Instead, the MES may learn certain STP parameters, e.g., a Switch ID, MSTP ID and Root Bridge ID, by listening (snooping) to the STP bridge protocol data units (BPDUs) within the network. In this case, as one example, the MES may construct the ESI from certain L2 parameters snooped from the STP as follows: {Switch ID (6 bits), MSTP ID (6 bits), Root Bridge ID (48 bits)}. Further details of the Spanning Tree Protocol are found in "Junos® OS for EX Series Ethernet Switches, Release 11.4: Spanning-Tree Protocols," Juniper Networks, Dec. 23, 2011, incorporated herein by reference.

Once assigned or determined, MESes 12 utilize BGP to a facilitate MAC address learning in the control plane via inter-device signaling rather than the data plane. For example, as further described below, MESes 12 may utilize Border Gateway Protocol (BGP) as a control plane signaling protocol between devices providing the MAC VPN. Moreover, MESes 12 may include the Ethernet Segment Identifiers (ESIs) for attachment circuits 17,25 to support multiple active points of attachment for a customer equipment, such as CE 14C that is multi-homed in an active-active arrangement with MESes 12B, 12C via attachment circuits 17. In this way, the techniques described herein may facilitate load-balancing among multiple active L2 attachment circuits within a MAC VPN so as to provide multi-homed, active-active L2 VPN connectivity.

Figures 2, 3:
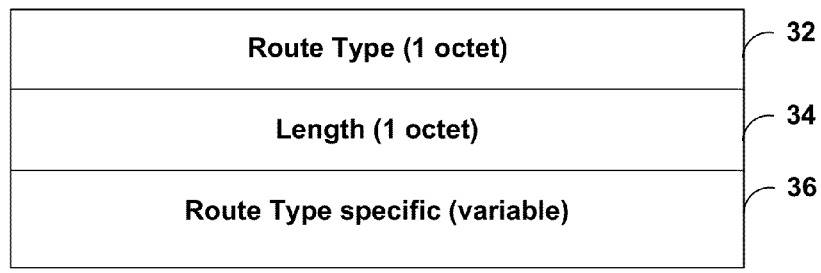
FIG. 2 illustrates an example construction of a new BGP NLRI, called the MAC-VPN NLRI.
FIG. 3 illustrates an example construction for an Ethernet Tag Auto-discovery route type for the MAC-VPN NLRI.

FIG. 2 illustrates an example construction of a new BGP Network Layer Reachability Information (NLRI), called the MAC-VPN NLRI 30. In general, a BGP advertisement includes a variable length field that lists NLRI for the feasible routes that are being advertised in a BGP attribute. The semantics of NLRI is identified by a combination of an Address Family Identifier and a Subsequent Address Family Identifier <AFI, SAFI> carried in the attribute. For more information about BGP NLRI encodings, see Rekhter, Y. and T. Li, "A Border Gateway Protocol 4 (BGP-4)", RFC 4271, January 2006.

In the example of FIG. 2, Route Type field 32 defines encoding of the rest of MAC-VPN NLRI 30, which is a Route Type specific MAC-VPN NLRI. Length field 34 indicates the length in octets of the Route Type specific field 36 of MAC-VPN NLRI. This document defines the following example Route Types: (1)—Ethernet Tag Auto-Discovery (A-D) route, (2) MAC advertisement route, (3) Inclusive Multicast Ethernet Tag Route, (4) Ethernet Segment Route, (5) Selective Multicast Auto-Discovery (A-D) Route, and (6) Leaf Auto-Discovery (A-D) Route. The detailed encoding and procedures for these route types are described in subsequent sections.

The MAC-VPN NLRI 30 may be carried in BGP using BGP Multiprotocol Extensions, as described in RFC4760, with a specific AFI and SAFI assigned for a MAC-VPN. The NLRI field in the MP_REACH_NLRI/MP_UN-REACH_NLRI attribute contains the MAC-VPN NLRI (encoded as specified above). In order for two BGP speakers to exchange labeled MAC-VPN NLRI, they may use BGP Capabilities Advertisement to ensure that they both are capable of properly processing such NLRI. For example, MESes 12 may operate in accordance with the procedures set forth in RFC4760, by using capability code 1 (multiprotocol BGP) with the specific AFI and SAFI defined for a MAC- VPN. For more information about BGP Capabilities Advertisement, see Bates, T., et al., "Multiprotocol Extensions for BGP-4," IETF RFC 4760, January 2007, the entire contents of which is incorporated by reference herein.

FIG. 3 illustrates an example construction for an Ethernet Tag Auto-discovery route type 40 for use within field 36 (FIG. 2) for MAC-VPN NLRI 30. If a CE is multi-homed to two or more MESes on a particular Ethernet segment, each MES advertises to other MESes in the MAC VPN, the information about the Ethernet tags (e.g., VLANs) on that Ethernet segment. For example, CE 14C is multi-homed to MES 12B, 12C. As such, each MES 12B, 12C advertise to MESes 12 in the MAC VPN the Ethernet tags used on Ethernet segment 19 for attachment circuits 17.

If a CE is not multi-homed, then the MES to which it is attached may elect to advertise the information about the Ethernet tags (e.g., VLANs) on the Ethernet segment connected to the CE.

The information about an Ethernet tag on a particular Ethernet segment is advertised using a BGP routing advertisement carrying an "Ethernet Tag Auto-Discovery route (Ethernet Tag A-D route)". This route is advertised using the MAC-VPN NLRI of FIG. 2.

MAC VPNs described herein support both the non-qualified and qualified learning model. When non-qualified learning is used, the Ethernet Tag Identifier 46 specified herein is set to a default value. When qualified learning is used, the Ethernet Tag Identifier 46, when required, is set to a MAC VPN provider-assigned tag that maps locally on the advertising MES to an Ethernet broadcast domain identifier, such as a VLAN ID.

The Ethernet Tag Auto-discovery information carried by route type 40 may be used for Designated Forwarder (DF) election, as described herein. The information may also be used to enable equal cost multi-path as described. Further, the information can be used to optimize withdrawal of MAC addresses as described herein.

Route-Distinguisher (RD) 42 is set to the RD of the MAC-VPN instance on the MES that is advertising the NLRI. A RD is assigned for each MAC-VPN instance on a MES. This RD is unique across all MAC-VPN instances on a MES. This can be accomplished by using a Type 1 RD as described in RFC4364. In one example, RD 42 is a value field that comprises an IP address of the MES (typically, the loopback address) followed by a number unique to the MAC-VPN instances on the MES. This number may be generated by the MES, or, in the Default Single VLAN MAC-VPN case, may be the 12 bit VLAN ID, with the remaining 4 bits set to 0.

Ethernet Segment Identifier 44 is an 8 octet entity to carry the ESI assigned to identify an Ethernet segment as described above. The Ethernet Tag ID 46 is the identifier of an Ethernet Tag on the Ethernet segment. This value may be a two octet VLAN ID or it may be another Ethernet Tag used by the MAC VPN provider. The value may be set to the default Ethernet Tag on the Ethernet segment.

The usage of the MPLS label 48 is described in further detail below.

The Originating Router's IP address 49 is set to an IP address of the PE. This address may be common for all the MVIs on the PE (e.g., this address may be PE's loopback address).

The Next Hop field of the MP_REACH_NLRI attribute of the route is set to the same IP address as the one carried in the Originating Router's IP Address field.

The Ethernet Tag A-D route 40 carries one or more Route Target (RT) attributes. RTs may be configured (as in IP VPNs), or may be derived automatically from the Ethernet Tag ID 46 associated with the advertisement. For example, the following is an example procedure for deriving the RT attribute automatically from the Ethernet Tag ID 46 associated with the advertisement: (1) The Global Administrator field of the RT is set to the Autonomous System (AS) number that the MES belongs to, and (2) The Local Administrator field of the RT contains a 4 octets long number that encodes the Ethernet Tag-ID.

The above auto-configuration of the RT implies that a different RT is used for every Ethernet Tag in a MAC-VPN, if the MAC-VPN contains multiple Ethernet Tags. For the "Default Single VLAN MAC-VPN" this results in auto-deriving the RT from the Ethernet Tag for that MAC-VPN.

Figure 4:
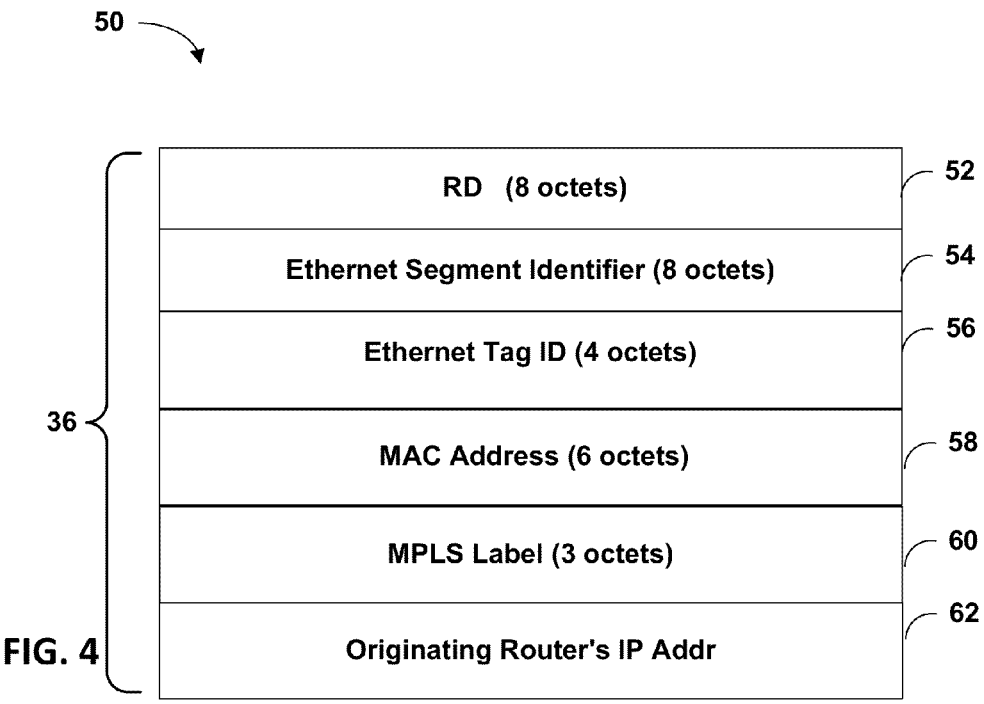
FIG. 4 shows an example construction for a MAC advertisement route type for advertising a MAC address within the MAC-VPN NLRI.

FIG. 4 shows an example construction for a MAC advertisement route type 50 for advertising MAC addresses for a MAV-VPN within field 36 of MAC-VPN NLRI 30 of a BGP advertisement. As described herein, MESes 12 apply MAC address learning techniques for determining reachability to unicast MAC Addresses within the context of a MAC-VPN. That is, in operation, MESes 12 forward VPN packets that they receive based on the destination MAC address within the packets. While forwarding L2 VPN traffic, MESes 12 "learn" the reachability of unicast MAC addresses and use this information to control packet forwarding. There are two components to MAC address learning, "local learning" and "remote learning."

With local learning, a particular MES learns the MAC addresses from the CEs to which the MES is connected. In particular, MESes 12 in a particular MAC-VPN support local data plane learning using Ethernet learning procedures. Each MES 12 learns MAC addresses in the data plane when it receives packets from the CE network, such as: (1) DHCP requests, (2) gratuitous ARP request for its own MAC, and (3) ARP request for a peer. Alternatively if a CE is a host then MESes may learn the MAC addresses of the host in the control plane.

In any event, FIG. 4 shows an example construction for a MAC advertisement route type 50 for advertising a MAC address within field 36 of MAC-VPN NLRI 30. In the encoding of FIG. 4, RD 52 is the RD of the MAC-VPN instance that is advertising the NLRI. The procedures for setting the RD for a given MAC VPN are described above.

The Ethernet Segment Identifier 54 is set to the eight octet ESI identifier, also described above, on which the MAC address was learned. If qualified learning is used and the MAC address that is learned from the CE is associated with an Ethernet Tag, then Ethernet Tag ID 56 is set to the Ethernet Tag Identifier assigned by the MAC VPN provider and mapped to the CE's Ethernet tag. If non-qualified learning is used Ethernet Tag identifier 56 may be set to the default Ethernet Tag on the Ethernet segment.

MAC address field 58 in an encoding of a 6-octet MAC address being advertised as reachable for the ESI within the MAC-VPN, where the encoding of the MAC address may be in accordance with IEEE 802.1D, incorporated herein by reference.

MPLS label 60 included in route advertisement 50 is the downstream assigned MAC-VPN MPLS label that is to subsequently be used by an upstream MES to forward MPLS encapsulated Ethernet packets to the advertising MES, where the destination MAC address in the Ethernet packet is the MAC address advertised in the above NLRI. The forwarding procedures are specified below. A MES may advertise the same MAC-VPN label for all MAC addresses in a given MAC-VPN instance. This label assignment methodology is referred to herein as a per MVI label assignment. As a second example, a MES may advertise a unique MAC-VPN label per <ESI, Ethernet Tag> combination. This label methodology is referred to herein as a per <ESI, Ethernet Tag> label assignment. As a third example, a MES may advertise a unique MAC-VPN label per MAC address.

Per MVI label assignment may require the least number of MAC-VPN labels, but may require a MAC lookup in addition to a MPLS lookup on an egress MES for forwarding. On the other hand a unique label per <ESI, Ethernet Tag> or a unique label per MAC may allow an egress MES to forward a packet that it receives from another MES, to the connected CE, after looking up only the MPLS labels and not having to do a MAC lookup.

The Originating Router's IP address 62 is set to an IP address of the PE. This address may be common for all the MVIs on the PE (e.g., this address may be PE's loopback address).

The Next Hop field of the MP_REACH_NLRI attribute of the route should be set to the same IP address as the one carried in Originating Router's IP Address field 62.

The BGP advertisement that advertises MAC advertisement route 50 may also carry one or more Route Target (RT) attributes. The assignment of RTs based on the Ethernet tag ID 56, as described above, should be followed.

In this way, each MES 12 is able to determine how to send traffic to MAC addresses that belong to or are behind CEs 14 connected to other MESes, i.e. to remote CEs or hosts behind remote CEs. These MAC addresses are referred to herein as "remote" MAC addresses, and each MES 12 learns remote MAC addresses in the control plane. That is, each MES 12 uses BGP in the control plane to advertise to all the other MESes 12 in the MAC-VPN the MAC addresses that the MES learns from its locally attached CEs 14. For this reason, BGP has been extended as described herein to advertise these MAC addresses using the MAC advertisement route type field 36 in the MAC-VPN-NLRI 30.

The techniques described herein do not require MESes to create forwarding state for remote MACs when they are learned in the control plane. When this forwarding state is actually created in the data plane may be determined locally by each MES.

In some cases, a CE that is a host or a router may be multi-homed directly to more than one MES in a MAC-VPN on a given Ethernet segment. For example, CE 14C of FIG. 1 is multi-homed on Ethernet segment 19 via MESes 12B, 12C. In such cases, one or more Ethernet Tags may be configured on the Ethernet segment. In this scenario one of the MESes 12B, 12C is selected as a Designated Forwarder (DF) and is responsible for certain actions. For example, the DF is responsible for sending multicast and broadcast traffic, on a given Ethernet Tag on a particular Ethernet segment, to the CE. This behavior, which allows selecting a DF at the granularity of <ESI, Ethernet Tag> for multicast and broadcast traffic, may be the default behavior. Optional mechanisms include allowing selecting a DF at the granularity of <ESI, Ethernet Tag, S, G>. In addition, the DF is responsible for flooding unknown unicast traffic (i.e. traffic for which a MES does not know the destination MAC address), on a given Ethernet Tag on a particular Ethernet segment to the CE, if the environment requires flooding of unknown unicast traffic.

A CE typically sends packets using a single link. For instance, if the CE is a host then, as mentioned earlier, the host treats the multiple links that it uses to reach the MESes as a Link Aggregation Group (LAG).

If a bridge network is multi-homed to more than one MES in a MAC-VPN via switches, then the support of active-active points of attachments as described in this specification requires the bridge network to be connected to two or more MESes using a LAG. In this case the reasons for doing DF election are the same as those described above when a CE is a host or a router.

If a bridge network does not connect to the MESes using LAG, then only one of the links between a CE that is a switch and the MESes is typically the active link. Other procedures may be used for supporting active-active points of attachments, when a bridge network does not connect to the MESes using LAG.

The granularity of the DF election is at least the Ethernet segment via which the CE is multi-homed to the MESes. If the DF election is done at the Ethernet segment granularity then a single MES is elected as the DF on the Ethernet segment.

If there are one or more Ethernet Tags (e.g., VLANs) on the Ethernet segment then the granularity of the DF election SHOULD be the combination of the Ethernet segment and Ethernet Tag on that Ethernet segment. In this case the same MES is elected as the DF for a particular Ethernet Tag on that Ethernet segment.

MESes 12B, 12C may perform a designated forwarder (DF) election, for Ethernet segment 19, or Ethernet segment/ Ethernet Tag combination using the Ethernet Tag A-D BGP route 40 described above.

One example process for the election of the DF for a particular ESI or a particular <ESI, Ethernet Tag> combination proceeds as follows. First, a MES constructs a candidate list of MESes. This list comprises all the Ethernet Tag A-D routes with that particular ESI or <ESI, Ethernet Tag> tuple that a MES imports in a MAC-VPN instance, including the Ethernet Tag A-D route generated by the MES itself, if any. The DF MES is chosen from this candidate list. Note that DF election is carried out by all the MESes that import the DF route.

The default procedure for choosing the DF is the MES with the highest IP address of all the MESes in the candidate list. This procedure is implemented to ensure that, except during routing transients, each MES chooses the same DF MES for a given ESI and Ethernet Tag combination. Other alternative procedures for performing DF election are possible.

Figure 5:
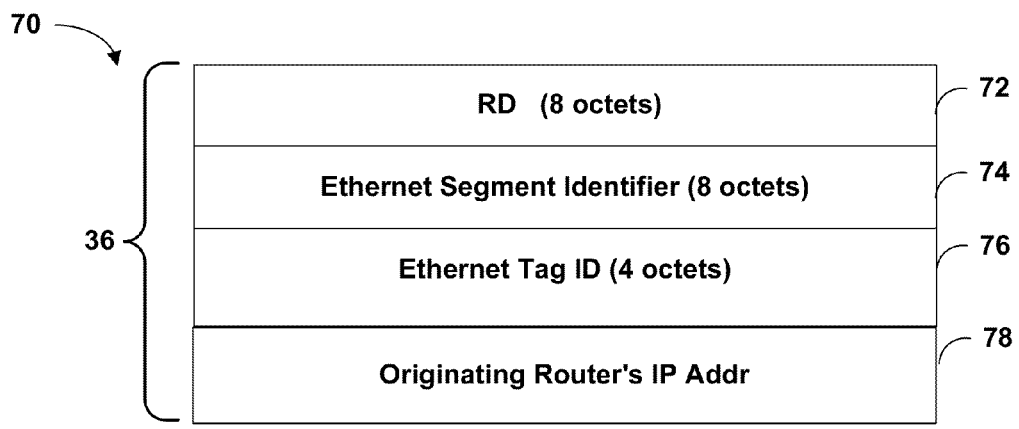
FIG. 5 shows an example construction for an Inclusive Multicast Ethernet Tag route type for the MAC-VPN NLRI.

FIG. 5 shows an example construction for an Inclusive Multicast Ethernet Tag route type 70 for field 36 of MAC-VPN NLRI 30. Multicast Ethernet Tag route type 70 may be useful, for example, for handling of broadcast, multicast and unknown unicast traffic, i.e., BUM traffic. Procedures are described for a given MES to send broadcast or multicast traffic, received from a CE encapsulated in a given Ethernet Tag in a MAC VPN, to all the other MESes that span that Ethernet Tag in the MAC VPN. In certain scenarios, described below, a given MES may also flood unknown unicast traffic to other MESes.

The MESes in a particular MAC-VPN instance may use ingress replication or P2MP LSPs to send unknown unicast, broadcast or multicast traffic to other MESes. Each MES advertises an "Inclusive Multicast Ethernet Tag Route" 70 to enable the above. This section provides the encoding and the overview of the Inclusive Multicast Ethernet Tag route. Subsequent sections describe in further detail its usage.

RD 72 is the RD of the MAC-VPN instance that is advertising the NLRI. The procedures for setting the RD for a given MAC VPN are described above.

The Ethernet Segment Identifier field 74 may be set to the eight octet ESI identifier described above. Alternatively, Ethernet Segment Identifier field 74 may be set to 0. For example, Ethernet Segment Identifier field 74 is set to 0 if the Ethernet Tag is set to 0.

The Ethernet Tag ID field 76 is set to the identifier of the Ethernet Tag. Ethernet Tag ID field 76 may be set to 0 in which case an egress MES perform a MAC lookup to forward the packet.

The Originating Router's IP address field 78 is set to an IP address of the PE. This address may be common for all the MVIs on the PE (e.g., this address may be PE's loopback address).

The Next Hop field of the MP_REACH_NLRI attribute of the route is set to the same IP address as the one carried in the Originating Router's IP Address field.

The BGP advertisement that advertises the Inclusive Multicast Ethernet Tag route may also carry one or more Route Target (RT) attributes. The automatic assignment of RTs from the Ethernet Tag ID may, for example, be followed.

The Inclusive Multicast Ethernet Tag route 70 carries a "PMSI Tunnel Attribute" in order to identify the provider tunnel ("P-Tunnel") used for sending broadcast, unknown unicast or multicast traffic within the service provider network, e.g., MPLS network 10.

Depending on the technology used for the P-tunnel for the MAC VPN on the PE, the PMSI Tunnel attribute of the Inclusive Multicast Ethernet Tag route 70 may be constructed as follows.

First, if the PE that originates the advertisement uses a P-Multicast tree for the P-tunnel for the MAC VPN, the PMSI Tunnel attribute contains the identity of the tree. In some case, the PE could create the identity of the tree prior to the actual instantiation of the tree.

Second, a PE that uses a P-Multicast tree for the P-tunnel may aggregate two or more Ethernet Tags in the same or different MAC VPNs present on the PE onto the same tree. In this case, in addition to carrying the identity of the tree, the PMSI Tunnel attribute carries an MPLS upstream assigned label which the PE has bound uniquely to the <ESI, Ethernet Tag> for MAC VPN associated with this BGP update message, as determined by its RTs. If the PE has already advertised Inclusive Multicast Ethernet Tag routes for two or more Ethernet Tags that it now desires to aggregate, then the PE MUST re-advertise those routes. The re-advertised routes are the same as the original ones, except for the PMSI Tunnel attribute and the label carried in that attribute.

Third, if the PE that originates the advertisement uses ingress replication for the P-tunnel for the MAC VPN, the route should include the PMSI Tunnel attribute with the Tunnel Type set to Ingress Replication and Tunnel Identifier set to a routable address of the PE. The PMSI Tunnel attribute carries a downstream assigned MPLS label. This label is used to demultiplex the broadcast, multicast or unknown unicast MAC VPN traffic received over a unicast tunnel by the PE.

The Leaf Information Required flag of the PMSI Tunnel attribute is set to zero and is ignored on receipt.

As described above the encoding rules allow setting the Ethernet Segment Identifier and Ethernet Tag to either valid values or to 0. If the Ethernet Tag is set to a valid value, then an egress MES can forward the packet to the set of egress ESIs in the Ethernet Tag, in the MAC VPN, by performing a MPLS lookup alone. Further if the ESI is also set to non zero then the egress MES does not need to replicate the packet as it is destined for a given Ethernet segment. If both Ethernet Tag and ESI are set to 0 then an egress MES MUST perform a MAC lookup in the MVI determined by the MPLS label, after the MPLS lookup, to forward the packet.

If a MES advertises multiple Inclusive Ethernet Tag routes for a given MAC VPN then the PMSI Tunnel Attributes for these routes should be distinct.

The procedures in this document do not require MESes to flood unknown unicast traffic to other MESes. If MESes learn CE MAC addresses via a control plane, the MESes can then distribute MAC addresses via BGP, and all unicast MAC addresses will be learnt prior to traffic to those destinations.

However, if a destination MAC address of a received packet is not known by the MES, the MES may have to flood the packet. Flooding takes into account "split horizon forwarding" as follows. When a MES capable of flooding receives a broadcast Ethernet frame, or one with an unknown destination MAC address, the MES floods the frame. If the frame arrived from an attached CE, the MES sends a copy of the frame to every other attached CE, as well as to all other MESs participating in the MAC VPN. If, on the other hand, the frame arrived from another MES, the MES sends a copy of the packet only to attached CEs. The MES does not send the frame to other MESs, since the MES from which the frame was received would have already done so. Split horizon forwarding rules apply to broadcast and multicast packets, as well as packets to an unknown MAC address.

Whether or not to flood packets to unknown destination MAC addresses may be an administrative choice, depending on how learning happens between CEs and MESes.

The MESes in a particular MAC VPN may use ingress replication using RSVP-TE P2P LSPs or LDP MP2P LSPs for sending broadcast, multicast and unknown unicast traffic to other MESes. Alternatively, they may use RSVP-TE or LDP P2MP LSPs for sending such traffic to other MESes.

If ingress replication is in use, the P-Tunnel attribute, carried in the Inclusive Multicast Ethernet Tag routes for the MAC VPN, specifies the downstream label that the other MESes can use to send unknown unicast, multicast or broadcast traffic for the MAC VPN to this particular MES.

The MES that receives a packet with this particular MPLS label treats the packet as a broadcast, multicast or unknown unicast packet. Further if the MAC address is a unicast MAC address, the MES treats the packet as an unknown unicast packet. The P-Tunnel attribute used by an MES for sending unknown unicast, broadcast or multicast traffic for a particular ethernet segment, is advertised in the Inclusive Ethernet Tag Multicast route as described in section 11.

The P-Tunnel attribute specifies the P2MP LSP identifier. Note that multiple Ethernet Tags, which may be in different MAC-VPNs, may use the same P2MP LSP, using upstream labels. When P2MP LSPs are used for flooding unknown unicast traffic, packet re-ordering is possible.

The MES that receives a packet on the P2MP LSP specified in the PMSI Tunnel Attribute MUST treat the packet as a broadcast, multicast or unknown unicast packet. Further if the MAC address is a unicast MAC address, the MES MUST treat the packet as an unknown unicast packet.

When a MES receives a unicast L2 packet from a CE, on a given Ethernet Tag, the MES first performs a lookup on the source MAC address of the packet. In certain environments the source MAC address may be used to authenticate the CE and determine that traffic from the host can be allowed into the network.

If the MES decides to forward the packet, the MES performs a lookup on the destination MAC address of the packet. If the MES has received MAC address advertisements for this destination MAC address from one or more other MESes or learned the destination MAC address from locally connected CEs, the destination MAC address is considered as a known MAC address. Otherwise, the MAC address is considered as an unknown MAC address.

For known MAC addresses, the MES forwards this packet to one of the remote MESes that is currently associated with the known MAC address. That is, the MES forwards the packet to the one of the remote MESes through with the MAC address is know to be reachable. The packet is encapsulated in the MAC-VPN MPLS label advertised by the remote MES, for that MAC address, and in the MPLS LSP label stack to reach the remote MES.

If the MAC address is unknown then an administrative policy on the MES may be checked to determine whether the policy requires flooding of unknown unicast traffic. If so, the MES floods the packet to other MESes. If the ESI over which the MES receives the packet is multi-homed, then the MES first encapsulates the packet in the ESI MPLS label as described below. If ingress replication is used, the MES replicates the packet one or more times to each remote MES with the bottom label of the stack being a MPLS label determined as follows. This is the MPLS label advertised by the remote MES in a PMSI Tunnel Attribute in the Inclusive Multicast Ethernet Tag route for an <ESI, Ethernet Tag> combination. The Ethernet Tag in the route is the same as the Ethernet Tag advertised by the ingress MES in its Ethernet Tag A-D route associated with the interface on which the ingress MES receives the packet. If P2MP LSPs are being used, the packet is sent on the P2MP LSP that the MES is the root of for the Ethernet Tag in the MAC-VPN. If the same P2MP LSP is used for all Ethernet Tags then all the MESes in the MAC VPN are the leaves of the P2MP LSP. If a distinct P2MP LSP is used for a given Ethernet Tag in the MAC VPN then only the MESes in the Ethernet Tag are the leaves of the P2MP LSP. The packet is encapsulated in the P2MP LSP label stack.

If the MAC address is unknown and the administrative policy on the MES does not allow flooding of unknown unicast traffic, the MES drops the packet.

Certain techniques are applied when forwarding packets received from a remote MES. When a MES receives a MPLS packet from a remote MES then, after processing the MPLS label stack, if the top MPLS label ends up being a P2MP LSP label associated with a MAC-VPN or the downstream label advertised in the P-Tunnel attribute then the packet is an unknown unicast. In this case, after performing the split horizon procedures, the following forwarding process occurs.

If the MES is the designated forwarder of unknown unicast, broadcast or multicast traffic, on a particular set of ESIs for the Ethernet Tag, the default behavior is for the MES to flood the packet on the ESIs. In other words the default behavior is for the MES to assume that the destination MAC address is unknown unicast, broadcast or multicast and it is not required to do a destination MAC address lookup, as long as the granularity of the MPLS label included the Ethernet Tag. As an option, the MES may do a destination MAC lookup to flood the packet to only a subset of the CE interfaces in the Ethernet Tag. For instance the MES may decide to not flood an unknown unicast packet on certain Ethernet segments even if it is the DF on the Ethernet segment, based on administrative policy.

If the MES is not the designated forwarder on any of the ESIs for the Ethernet Tag, the default behavior is for it to drop the packet.

If the top MPLS label ends up being a MAC-VPN label that was advertised in the unicast MAC advertisements (i.e., known unicast), then the MES either forwards the packet based on CE next-hop forwarding information associated with the label or does a destination MAC address lookup to forward the packet to a CE.

Techniques are described for split horizon flooding in the context of multi-homed CEs. Consider CE 14C that is multi-homed to two MESes 12B, 12C on an Ethernet segment 19. If CE 14C sends a multicast, broadcast or unknown unicast packet to a particular MES, say MES 12B, then MES 12B will forward that packet to all or subset of the other MESes in the MAC VPN. In this case, MES 12C to which CE 12C is multi-homed, receives the packet from the MPLS network 10 but drops the packet and does not forward back to CE 14C. This is referred to as "split horizon" in this document.

Figure 6:
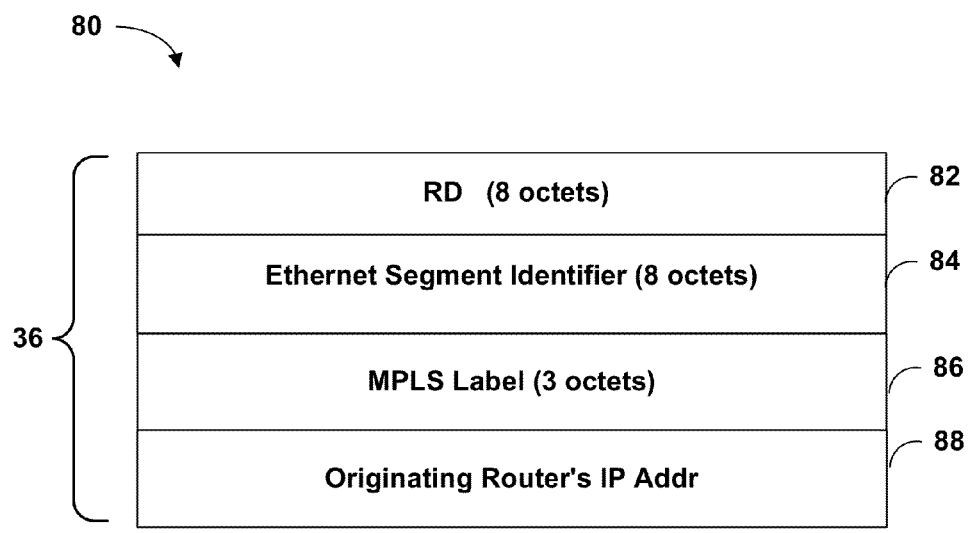
FIG. 6 shows an example construction for an Ethernet Segment route type for the MAC-VPN NLRI.

FIG. 6 shows an example construction for an Ethernet Segment route type 80 for field 36 of MAC-VPN NLRI 30 for BGP messages between MESes connected to the same active-active Ethernet segment. In order to accomplish proper split horizon flooding, each MES 12B, 12C distributes to each other (i.e., all other MESes that are connected to the Ethernet segment) an "Ethernet Segment Route" that specifies an MPLS label to be used when forwarding to the advertising MES any L2 communications received from a customer device via a particular Ethernet segment.

RD 82 is the RD of the MAC-VPN instance that is advertising the NLRI. The procedures for setting the RD for a given MAC VPN are described above.

The Ethernet Segment Identifier 84 may be set to the eight octet ESI identifier described above.

MPLS label 86 may be referred to as an "ESI MLPS label." This label is a downstream assigned MPLS label if the advertising MES is using ingress replication for sending multicast, broadcast or unknown unicast traffic, to other MESes. If the advertising MES is using P2MP MPLS LSPs for the same, then this label may be an upstream assigned MPLS label. The usage of this label is described below. Further details of upstream label assignment for P2MP MPLS LSPs are described in U.S. patent application Ser. No. 11/212,509, entitled "Aggregate Multicast Trees for Multicast Virtual Private Networks," by Rahul Aggarwal and Yakov Rekhter, the entire contents of which are incorporated herein by reference.

The Originating Router's IP address 88 is set to an IP address of the PE. This address should be common for all the MVIs on the PE (e.g., this address may be PE's loopback address).

The Next Hop field of the MP_REACH_NLRI attribute of the route is set to the same IP address as the one carried in the Originating Router's IP Address field.

The BGP advertisement that advertises the Ethernet Segment route may also carry one Route Target (RT) attribute.

Route type 80 may be enhanced to carry LAG specific information, such as LACP parameters, between the MESes of the LAG.

An MES that is using ingress replication for sending broadcast, multicast or unknown unicast traffic, distributes to other MESes that belong to the ethernet segment a downstream assigned "ESI MPLS label" in the Ethernet Segment route. This label may be programmed in the platform label space by the advertising MES. Further the forwarding entry for this label results in not forwarding packets received with this label onto the ethernet segment for which the label was distributed.

Consider MES 12B and MES 12C that are multi-homed to CE 14C on ESI 19. Further consider an example in which MES 12B is using P2P or MP2P LSPs to send packets to MES 12C. Consider that MES 12B receives a multicast, broadcast or unknown unicast packet from CE 14C on a VLAN1 on ESI 19.

It may be the case that MES 12C has distributed a unique Inclusive Multicast Ethernet Tag route for VLAN1 for each Ethernet segment on MES2. In this case, MES 12B does not replicate the packet to MES 12C for <ESI1, VLAN1>.

Alternatively it may be the case where MES 12C has distributed a single Inclusive Multicast Ethernet Tag route for VLAN1 for all Ethernet segments on MES2. In this case, when MES 12B sends a multicast, broadcast or unknown unicast packet that it receives from CE 14C, MES 12B first pushes onto the MPLS label stack the ESI label that MES 12C has distributed for ESI 19. MES 12B then pushes on the MPLS label distributed by MES 12C in the Inclusive Ethernet Tag Multicast route for Ethernet Tag1. The resulting packet is further encapsulated in the P2P or MP2P LSP label stack required to transmit the packet to MES 12C. When MES 12C receives this packet, it determines the set of ESIs to replicate the packet to from the top MPLS label, after any P2P or MP2P LSP labels have been removed. If the next label is the ESI label assigned by MES 12C then MES 12C does not forward the packet onto ESI 19.

An MES that is using P2MP LSPs for sending broadcast, multicast or unknown unicast traffic, distributes to other MESes, that belong to the Ethernet segment, an upstream assigned "ESI MPLS label" in the Ethernet Segment route. This label is upstream assigned by the MES that advertises the route. This label may be programmed by the other MESes that are connected to the ESI advertised in the route in the context label space for the advertising MES. Further, the forwarding entry for this label should result in not forwarding packets received with this label onto the Ethernet segment for which the label was distributed.

Consider again MES 12B and MES 12C that are multi-homed to CE 14C on ES1. Further assume that MES 12B is using P2MP MPLS LSPs to send broadcast, multicast or unknown unicast packets. When MES 12B sends a multicast, broadcast or unknown unicast packet, that it receives from CE 14C, it first pushes onto the MPLS label stack the ESI label that it has assigned for ESI 19 on which the packet was received. The resulting packet is further encapsulated in the P2MP MPLS label stack necessary to transmit the packet to the other MESes (MES 12C in this example). Penultimate hop popping should be disabled on the P2MP LSPs used in the MPLS transport infrastructure for MAC VPN. When MES 12C receives this packet, it decapsulates the top MPLS label and forwards the packet using the context label space determined by the top label. If the next label is the ESI label assigned by MES 12B then MES 12C does not forward the packet onto ESI1.

This disclosure also specifies how load balancing of unicast packets is achieved to/from a CE that has more than one active interface that is directly connected to one or more MESes. The CE may be a host or a router or it may be a switched network that is connected via LAG to the MESes.

Load balancing of traffic from a MES to remote CEs is first described. Whenever a remote MES imports a MAC advertisement for a given <ESI, Ethernet Tag> in a MAC VPN instance, it considers the MAC as reachable via all the MESes from which it has imported Ethernet Tag A-D routes for that <ESI, Ethernet Tag>. Further the remote MES uses these MAC advertisement and Ethernet Tag A-D routes to construct the set of next-hops that it can use to send the packet to the destination MAC. Each next-hop comprises a MPLS label, that is to be used by the egress MES to forward the packet. This label is determined as follows. If the next-hop is constructed as a result of a MAC route which has a valid MPLS label, then this label is used. However if the MAC route doesn't have a valid MPLS label or if the next-hop is constructed as a result of an Ethernet Tag A-D route then the MPLS label from the Ethernet Tag A-D route is used.

Consider a CE 14C4C that is dual homed to two MESes, MES 12B and MES 12C, on a LAG interface, ES 19, and is sending packets with MAC address MAC1 on VLAN1. Based on MAC-VPN extensions described in sections 8 and 9, a remote MES say MES 12A is able to learn that a MAC1 is reachable via MES 12B and MES 12C. Both MES 12B and MES 12C may advertise MAC1 in BGP if they receive packets with MAC1 from CE 14C. If this is not the case and if MAC1 is advertised only by MES 12B, MES 12A still considers MAC1 as reachable via both MES 12B and MES 12C as both MES 12B and MES 12C advertise an Ethernet Tag A-D route for <ESI1, VLAN1>.

The MPLS label stack to send the packets to MES 12B is the MPLS LSP stack to get to MES 12B and the MAC-VPN label advertised by MES 12B for CE 14C's MAC. The MPLS label stack to send packets to MES 12C is the MPLS LSP stack to get to MES 12C and the upstream assigned label in the Ethernet Tag A-D route advertised by MES 12C for <ES1, VLAN1>, if MES 12C has not advertised MAC1 in BGP.

We will refer to these label stacks as MPLS next-hops.

The remote MES, e.g., MES 12A, can now load balance the traffic it receives from its CEs, destined for CE 14C, between MES 12B and MES 12C. MES 12A may use the IP flow information for it to hash into one of the MPLS next-hops for load balancing for IP traffic. Or MES 12A may rely on the source and destination MAC addresses for load balancing.

Note that once MES 12A decides to send a particular packet to MES 12B or MES 12C it can pick from more than path to reach the particular remote MES using MPLS procedures. For instance if the tunneling technology is based on RSVP-TE LSPs, and MES 12A decides to send a particular packet to MES 12B then MES 12A can choose from multiple RSVP-TE LSPs that have MES 12B as their destination.

When MES 12B or MES 12C receive the packet destined for CE 14C from MES 12A, if the packet is a unicast MAC packet it is forwarded to CE 14C. If it is a multicast or broadcast MAC packet then only one of MES 12B or MES 12C must forward the packet to the CE. Which of MES 12B or MES 12C forward this packet to the CE is determined by default based on which of the two is the DF. An alternate procedure to load balance multicast packets will be described in the future.

If the connectivity fails between the multi-homed CE and one of the MESes to which is multi-homed, the MES withdraws the MAC address from BGP. This enables the remote MESes to remove the MPLS next-hop to this particular MES from the set of MPLS next-hops that can be used to forward traffic to the CE. Further details and procedures on withdrawal of MAC VPN route types in the event of MES to CE failures are described below.

Load balancing of traffic between a MES and a local CE is now described. A CE may be configured with more than one interface connected to different MESes or the same MES for load balancing. The MES(s) and the CE can load balance traffic onto these interfaces using one of the following mechanisms: data plane learning or control plane learning.

With respect to data plane learning, consider that the MESes perform data plane learning for local MAC addresses learned from local CEs. This enables the MES(s) to learn a particular MAC address and associate it with one or more interfaces. The MESes can now load balance traffic destined to that MAC address on the multiple interfaces. Whether the CE can load balance traffic that it generates on the multiple interfaces is dependent on the CE implementation.

With respect to control plane learning, the CE can be a host that advertises the same MAC address using a control protocol on both interfaces. This enables the MES(s) to learn the host's MAC address and associate it with one or more interfaces. The MESes can now load balance traffic destined to the host on the multiple interfaces. The host can also load balance the traffic it generates onto these interfaces and the MES that receives the traffic employs MAC-VPN forwarding procedures to forward the traffic.

In the case where a CE is a host or a switched network connected on a first ESI to hosts, the MAC address that is reachable via a given MES may move such that it becomes reachable via a second ESI via the same MES or on another MES. This is referred to as a "MAC Move" and the techniques described herein support such events. For example, remote MESes distinguish a MAC move from the case where a MAC address on an ESI is reachable via two different MESes and load balancing is performed as described above. This distinction can be made as follows. If a MAC is learned by a particular MES from multiple MESes, then the MES performs load balancing only amongst the set of MESes that advertised the MAC with the same ESI. If this is not the case then the MES chooses only one of the advertising MESes to reach the MAC as per BGP path selection.

There can be traffic loss during a MAC move. Consider MAC1 that is advertised by MES1 and learned from CE1 on ESI1. If MAC1 now moves behind MES2, on ESI2, MES2 advertises the MAC in BGP. Until a remote MES, MES3, determines that the best path is via MES2, it will continue to send traffic destined for MAC1 to MES1. This will not occur deterministically until MES1 withdraws the advertisement for MAC1.

One optimization to reduce the traffic loss during MAC moves is the following option. When an MES sees a MAC update from a CE on an ESI, which is different from the ESI on which the MES has currently learned the MAC, the corresponding entry in the local bridge forwarding table SHOULD be immediately purged causing the MES to withdraw its own MAC-VPN MAC advertisement route and replace it with the update. Other optimized procedures to minimize traffic loss during MAC moves.

The MESes in a particular MAC-VPN may use ingress replication or P2MP LSPs to send multicast traffic to other MESes.

The MESes may use ingress replication for flooding unknown unicast, multicast or broadcast traffic as described above. A given unknown unicast or broadcast packet must be sent to all the remote MESes. However a given multicast packet for a multicast flow may be sent to only a subset of the MESes. Specifically a given multicast flow may be sent to only those MESes that have receivers that are interested in the multicast flow. Determining which of the MESes have receivers for a given multicast flow is done using explicit tracking described below.

Alternatively, a MES may use an "Inclusive" tree for sending an unknown unicast, broadcast or multicast packet or a "Selective" tree.

A variety of transport technologies may be used in the SP network. For inclusive P-Multicast trees, these transport technologies include point-to-multipoint LSPs created by RSVP-TE or mLDP. For selective P-Multicast trees, only unicast MES-MES tunnels (using MPLS or IP/GRE encapsulation) and P2MP LSPs are supported, and the supported P2MP LSP signaling protocols are RSVP-TE, and mLDP.

An Inclusive Tree allows the use of a single multicast distribution tree, referred to as an Inclusive P-Multicast tree, in the SP network to carry all the multicast traffic from a specified set of MAC VPN instances on a given MES. A particular P-Multicast tree can be set up to carry the traffic originated by sites belonging to a single MAC VPN, or to carry the traffic originated by sites belonging to different MAC VPNs. The ability to carry the traffic of more than one MAC VPN on the same tree is termed 'Aggregation'. The tree needs to include every MES that is a member of any of the MAC VPNs that are using the tree. This implies that a MES may receive multicast traffic for a multicast stream even if it doesn't have any receivers that are interested in receiving traffic for that stream.

An Inclusive P-Multicast tree as defined in this document is a P2MP tree. A P2MP tree is used to carry traffic only for MAC VPN CEs that are connected to the MES that is the root of the tree.

The procedures for signaling an Inclusive Tree may be similar to those described in "Multicast in VPLS". R. Aggarwal et. al., December 2008, with the VPLS-AD route replaced with the Inclusive Multicast Ethernet Tag route. The P-Tunnel attribute for an Inclusive tree is advertised in the Inclusive Ethernet Tag A-D route as described above. Note that a MES can "aggregate" multiple inclusive trees for different MAC-VPNs on the same P2MP LSP using upstream labels. The procedures for aggregation are the same as those described in "Multicast in VPLS", with VPLS A-D routes replaced by MAC-VPN Inclusive Multicast Ethernet Tag A-D routes. "Multicast in VPLS". R. Aggarwal et. al., December 2008, is hereby incorporated herein by reference.

A Selective P-Multicast tree is used by a MES to send IP multicast traffic for one or IP more specific multicast streams, originated by CEs connected to the MES, that belong to the same or different MAC VPNs, to a subset of the MESs that belong to those MAC VPNs. Each of the MESs in the subset should be on the path to a receiver of one or more multicast streams that are mapped onto the tree. The ability to use the same tree for multicast streams that belong to different MAC VPNs is termed a MES the ability to create separate SP multicast trees for specific multicast streams, e.g. high bandwidth multicast streams. This allows traffic for these multicast streams to reach only those MES routers that have receivers in these streams. This avoids flooding other MES routers in the MAC VPN.

A SP can use both Inclusive P-Multicast trees and Selective P-Multicast trees or either of them for a given MAC VPN on a MES, based on local configuration.

The granularity of a selective tree is <RD, MES, S, G> where S is an IP multicast source address and G is an IP multicast group address or G is a multicast MAC address. Wildcard sources and wildcard groups are supported. Selective trees require explicit tracking as described below.

A MAC-VPN MES advertises a selective tree using a MAC-VPN selective A-D route. The procedures are the same as those in "Multicast in VPLS" with S-PMSI A-D routes in "Multicast in VPLS" replaced by MAC-VPN Selective A-D routes. The information elements of the MAC VPN selective A-D route are similar to those of the VPLS S-PMSI A-D route with the following differences. A MAC VPN Selective A-D route includes an optional Ethernet Tag field. Also a MAC VPN selective A-D route may encode a MAC address in the Group field. The encoding details of the MAC VPN selective A-D route will be described in the next revision.

Selective trees can also be aggregated on the same P2MP LSP using aggregation as described in "Multicast in VPLS."

"Multicast in VPLS" describes procedures for explicit tracking that rely on Leaf A-D routes. The same procedures are used for explicit tracking in this specification with VPLS Leaf A-D routes replaced with MAC-VPN Leaf A-D routes. These procedures allow a root MES to request multicast membership information for a given (S, G), from leaf MESs. Leaf MESs rely on IGMP snooping or PIM snooping between the MES and the CE to determine the multicast membership information.

This section describes failure recovery from different types of network failures. Transit Link and Node Failures between MESes are described first. The use of existing MPLS Fast- Reroute mechanisms can provide failure recovery in the order of 50 ms, in the event of transit link and node failures in the infrastructure that connects the MESes.

Consider a host host1 that is dual homed to MES1 and MES2. If MES1 fails, a remote MES, MES3, can discover this based on the failure of the BGP session. This failure detection can be in the sub-second range if BFD is used to detect BGP session failure. MES3 can update its forwarding state to start sending all traffic for host1 to only MES2. This failure recovery is potentially faster than what would be possible if data plane learning were to be used. As in that case MES3 would have to rely on re-learning of MAC addresses via MES2.

It is possible to perform local repair in the case of MES failures.

MES to CE network failures are now described. When an Ethernet segment connected to a MES fails or when a Ethernet Tag is deconfigured on an Ethernet segment, then the MES withdraws the Ethernet Tag A-D route(s) announced for the <ESI, Ethernet Tags> that are impacted by the failure or de-configuration. In addition the MES also withdraws the MAC advertisement routes that are impacted by the failure or de-configuration.

The Ethernet Tag A-D routes should be used by an implementation to optimize the withdrawal of MAC advertisement routes. When a MES receives a withdrawal of a particular Ethernet Tag A-D route it considers all the MAC advertisement routes that are learned from the same <ESI, Ethernet Tag> as in the Ethernet Tag A-D route as having been withdrawn. This optimizes the network convergence times in the event of MES to CE failures.

The techniques described herein may be used as BGP/MPLS MAC VPNs as technology for a VPLS service. In addition, the techniques may be used for BGP/MPLS MAC VPNs for layer 2 extension between data centers and, in particular, to provide L2 and L3 interconnect between servers/virtual machines in a data center and between clients and the servers/virtual machines. The servers/virtual machines may be in the same data center or in different data centers. The BGP-MPLS based technology described herein may be applied as a data center interconnect between data center switches for intra-VLAN forwarding i.e., layer 2 extension between the data centers.

The techniques allow virtual machines to move within the same subnet/VLAN of a data center interconnect without requiring renumbering. This allows VM migration in the same VLAN for load optimization. This also allows the MAC address and IP address of a VM to be retained for seamless application experience. Moreover, a subnet, i.e., a VLAN, may span multiple data centers with optimal forwarding between servers.

Figure 7:
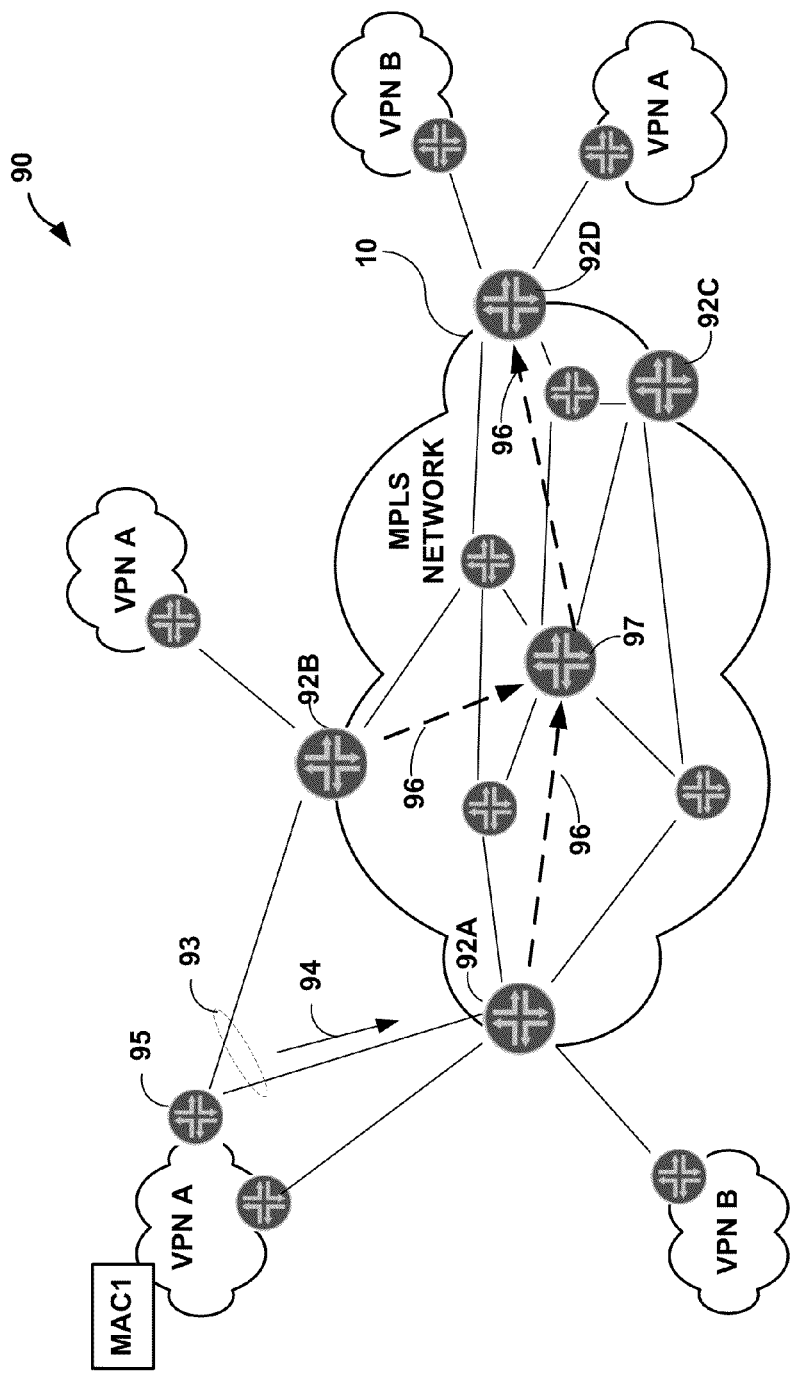
FIG. 7 is a block diagram illustrating example MAC VPN MAC address learning using BGP.

FIG. 7 is a block diagram illustrating MAC VPN MAC address learning using BGP within a computer environment 90. In the example of FIG. 7, MESes 92A-92D provide two separate MAC VPNs A, B. Moreover, CE 95 of one of the sites for VPN A is multi-homed to MESes 92A, 92B in an active-active configuration via Ethernet segment 93. As such, both MESes 92A and 92B output BGP advertisements 96 in the form of Ethernet tag auto-discovery routes 40, an example of which carries parameters <RD-1, ESI 1, VLAN 1, MPLS label, VPN A RT>, which MES 92D learns in turn via route reflector 97. While forwarding traffic for VPN A, MES 92A receive L2 Ethernet frame 94 having a source address of MAC 1, causing MES 92A to locally learn MAC 1 in the data plane and advertise MAC 1 in the control plane by outputting an advertisement in the form of an Ethernet MAC route message 50 carrying parameters <RD-1, A1 ESI 1, A1-VLAN, MAC MPLS LABEL 1, MAC 1, VPN A RT>, which MES 92D also learns via route reflector 97. In this way, MES 92 D learns via BGP signaling messages that MAC 1 is dual-home to MESes 92A, 92B. MES 92D may learn that MAC 1 is dual homed in this manner even if MES 92B does not advertise MAC 1 since MES 92D has been informed via the Ethernet Tag auto-discovery routes 96 that MES 92B is also connected to <ESI 1, VLAN 1>, i.e., Ethernet segment 93.

Figure 8:
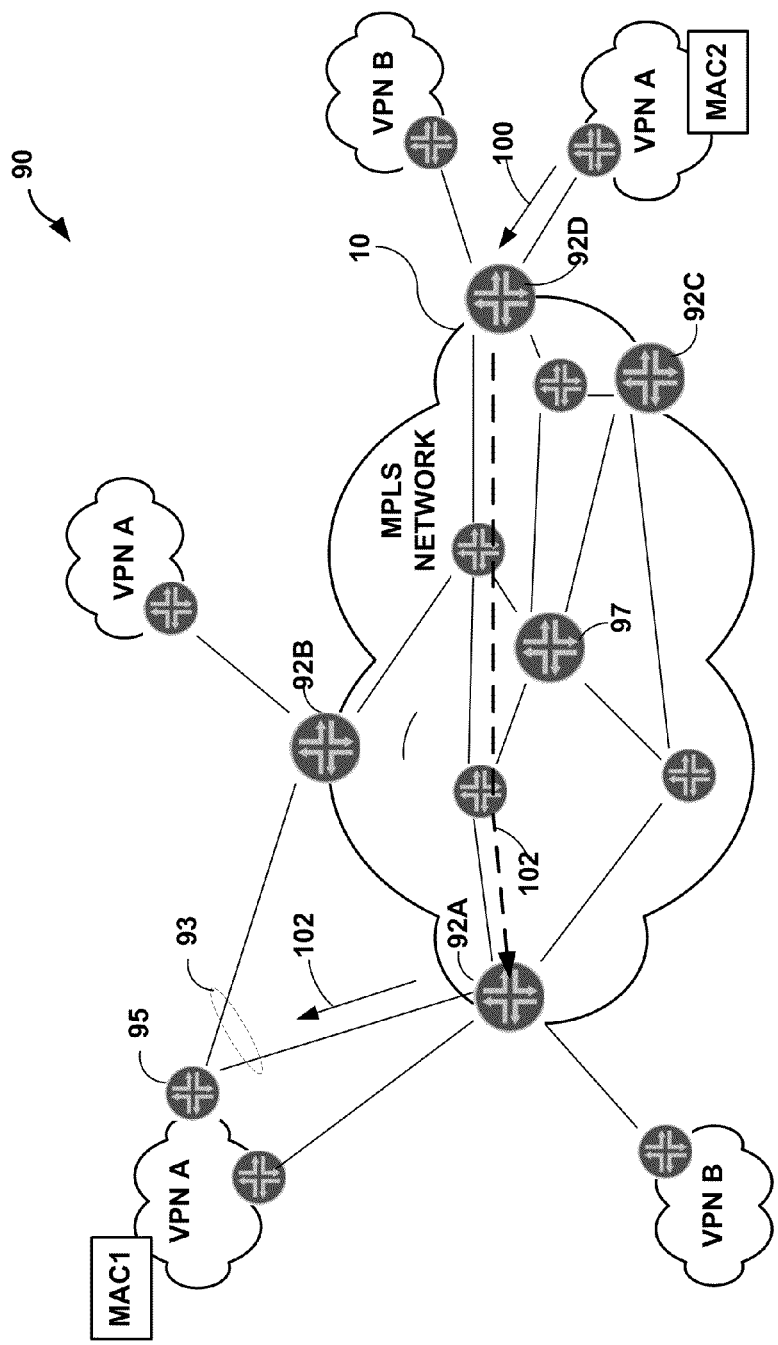
FIG. 8 is a block diagram illustrating example unicast data plane forwarding functionality for a MAC VPN.

FIG. 8 is a block diagram illustrating unicast data plane forwarding functionality for a MAC VPN with respect to computer environment 90. In particular, FIG. 8 illustrates MES 92D subsequently receiving an Ethernet frame 100 from a device having a source MAC address of MAC 2 and a destination MAC address of MAC 1. In response, MES 92D outputs a packet to MES 92A using an inner label of the MAC MPLS LABEL 1 advertised by 92A for MAC 1 and an outer MPLS label for LSP 102. Alternatively, MES 92D may utilize an IP/GRE header in the event that tunnel 102 is an IP/GRE tunnel. In either case, upon receiving the packet, MES 92A forwards the Ethernet frame 102 to VPN A, e.g., via CE 95. MES 92D may load balance traffic having a destination address of MAC 1 between MESes 92A, 92B having learned that MAC 1 is reachable both MESes via active-active multi-homed Ethernet segment 93.

Figure 9:
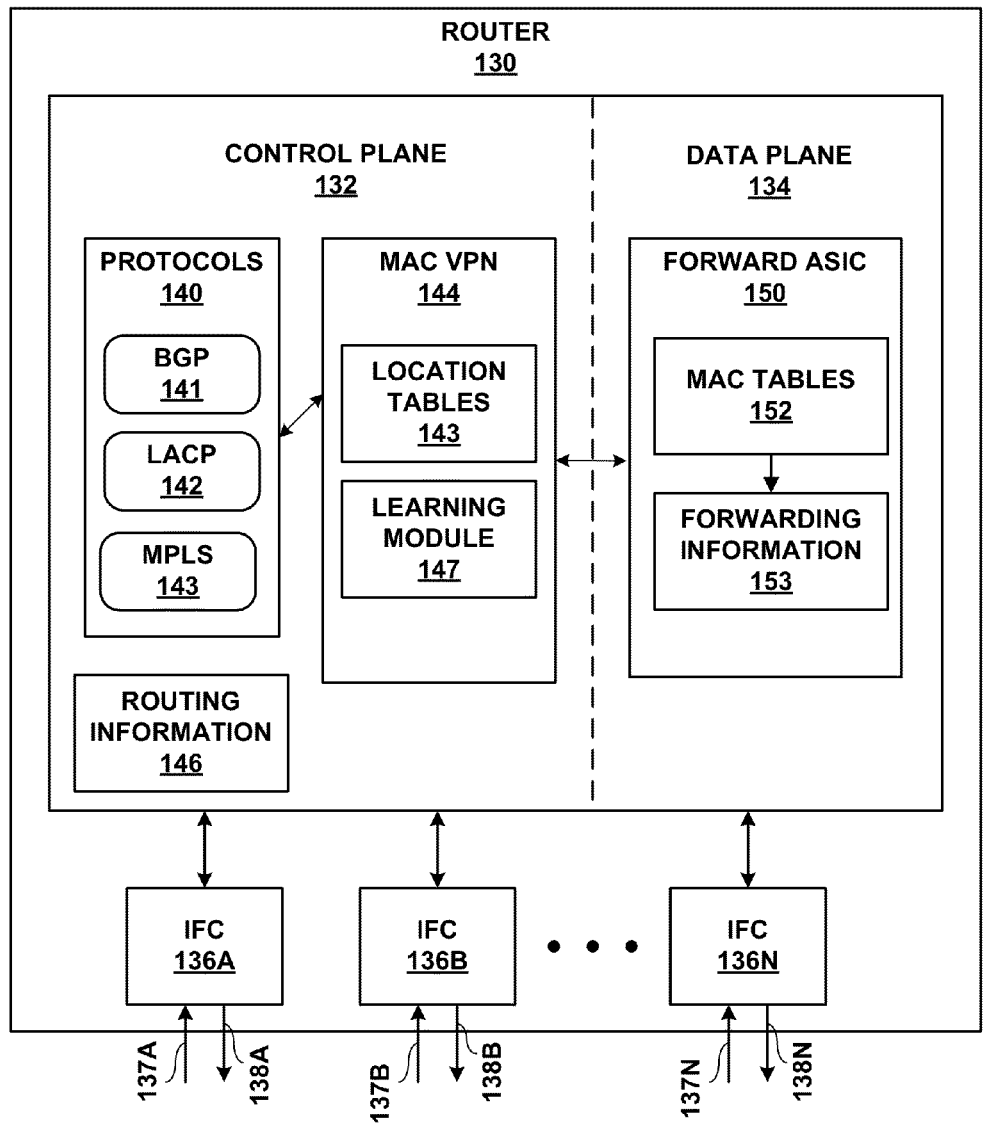
FIG. 9 is a block diagram illustrating an exemplary router configured to operate as described herein.

FIG. 9 is a block diagram illustrating an exemplary router 130 configured to operate in accordance with the techniques described herein. Router 130 may comprise a PE router that operates substantially similar to any of MESes 12. Router 130 includes interface cards 136A-136N ("IFCs 136") that receive control packets and data packets via inbound links 137A-137N ("inbound links 137") and send control packets and data packets via outbound links 138A-138N ("outbound links 138"). IFCs 136 are typically coupled to links 137, 138 via a number of interface ports. Router 130 also includes a control plane 132 that determines routes of received packets and a data plane 134 that forwards the packets accordingly via IFCs 136.

Control plane 132 represents high-level control functions for router 130 and typically provides routing protocols, device management and configuration functions and other administrative functions. For example, control plane 132 provides an operating environment for protocols 140 to execute, which may be software processes executing on one or more processors. In the illustrated embodiment, protocols 140 include the border gateway protocol (BGP) 41 configured to operate in accordance with the techniques described herein. As another example, control plane 132 may execute Link Aggregation Control Protocol (LACP) 142 that bundles interfaces associated with multiple attachment circuits and treat the bundle as a single logical interface in terms of L2 forwarding, as described herein. In addition, control plane executes one or more MPLS protocols 143 for distributing MPLS labels between routing devices, such as the label distribution protocol (LDP) or the Resource Reservation Protocol with Traffic Engineering extensions (RSVP-TE).

Control plane 132 maintains routing information 146, which describes the topology of a network and, in particular, routes through the network. Routing information 146 may include, for example, route data that describes various routes within the first AS, and corresponding next hop data indicating appropriate neighboring devices within the first AS for each of the routes. Protocols 140 (e.g., BGP 141 and MPLS 143) executing within control plane 132 of router 130 update routing information 146 to accurately reflect the topology of the autonomous system in which router 130 resides as well as label distributions utilized by router 130. Control plane 132 generates and maintains forwarding information 153 within data plane 134 based on routing information 146. Typically, control plane 132 generates forwarding information 153 in the form of a radix tree to map packet information (e.g., header information having destination information and/or a label stack) to next hops and ultimately to interface ports of IFCs 136. U.S. Pat. No. 7,184,437 provides details on an exemplary embodiment of a router that utilizes a radix tree for route resolution, the contents of which is incorporated herein by reference in its entirety.

Data plane 134 represent hardware and logic functions that provide high-speed forwarding of network traffic. Data plane 134 maintains forwarding information 153 for each VPLS established by router 130 to associate network destinations with specific next hops and the corresponding interface ports. In general, when router 130 receives a data packet on a pseudowire of a given VPLS via one of inbound links 137, data plane 134 identifies an associated next hop for the data packet by traversing forwarding information 153 based on information (e.g., labeling information) within the packet. Data plane 134 forwards the data packet on one of outbound links 138 to the corresponding next hop in accordance with forwarding information 153. At this time, data plane may push and/or pop labels from the packet to forward the packet to a CE or within an MPLS network.

Control plane 132 also includes a MAC VPN module 144 having learning module 147 that performs L2 learning, e.g., learning of customer device MAC addresses based on BGP signaling messages and based on interaction with data plane 134 for locally learned MAC addresses. MAC VPN module 144 within the control plane maintains location tables 143 for each MAC VPN instance established by router 130. Learning module 147 may alternatively reside within data plane 134.

Forwarding ASIC 150 in data plane 134 performs local MAC address learning and includes control logic that automatically update portions of internally programmed forwarding information 153 for each MAC VPN and informs MAC VPN 144 of the updates. As part of data plane 134, forwarding ASIC 150 is invoked when router 130 receives data packets associated with the MAC VPNs established by router 130. Forwarding ASIC 150 performs MAC address learning and updates the one of MAC tables 152 associated with the MAC VPN to initially record associations between the MAC VPN and the source MAC addresses of the customer devices from which the data packets were received. MAC VPN 144 updates location tables 143 in response to local MAC address learning via forwarding ASIC 150 and directs BGP 141 to signal the updates to other peer BGP routers participating in the MAC VPN as described herein. In addition, learning module 147 in control plane 132 may learn L2 MAC information for the MAC VPN via BGP 141. Learning module 147 records the information in location tables 143 associated with the MAC VPN instance and communicates the information to forwarding ASIC 150 in data plane 134. At this time, in accordance with the encodings described herein, BGP 141 may learn particular MPLS labels for use when forwarding L2 traffic for a MAC VPN and may program the MPLS labels within forwarding information 153.

The architecture of router 130 illustrated in FIG. 92 is shown for exemplary purposes only. The disclosure is not limited to this architecture. In other embodiments, router 130 may be configured in a variety of ways. In one embodiment, for example, some of the functionally of control plane 132 and data plane 134 may be distributed within IFCs 136. In another embodiment, control plane 132 may include a routing engine that performs routing functions and maintains routing information base (RIB), e.g., routing information 146, and data plane 134 may include a forwarding engine that performs packet forwarding based on a forwarding information base (FIB), e.g., forwarding information 153, generated in accordance with the RIB and MAC tables 52.

Control plane 132 and data plane 134 may be implemented solely in software, or hardware, or may be implemented as combinations of software, hardware, or firmware. For example, control plane 132 and data plane 134 may include one or more processors which execute software instructions. In that case, the various software modules of control plane 132 and data plane 134 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable media.

Many of the techniques described herein have been described with respect to a network router. Other example architectures for router may be found in U.S. Patent Application 2008/0044181, entitled "MULTI-CHASSIS ROUTER WITH MULTIPLEXED OPTICAL INTERCONNECTS," and U.S. patent application Ser. No. 12/235,677, entitled "Forwarding Plane Configuration for Separation of Services and Forwarding in an Integrated Services Router," filed on Sep. 23, 2008, the entire contents of both of which are incorporated herein by reference herein.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" generally refers to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium generally cause a programmable processor, or other processor, to perform the method, e.g., when the instructions are executed. Computer readable storage media include, for example, random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media. In this sense, the computer-readable storage medium may comprise a non-transitory computer-readable storage medium.

Various examples have been described. These and other examples are within the scope of the following claims.

What is claimed is:

1. A method comprising:
    receiving, at a first multi-protocol label switching (MPLS) edge switch, a layer two (L2) communication from a first one of a plurality of customer networks via an attachment circuit coupling the first MPLS edge switch to the first one of the plurality of customer networks, wherein the L2 communication includes a media access control (MAC) address for a customer device within the first customer network, wherein the first MPLS edge switch is one of a plurality of the first MPLS edge switches that provide a layer two (L2) virtual private network (VPN) through a provider network for the plurality of customer networks, and wherein the first one of the customer networks is coupled to a second one of the MPLS edge switches of the VPN by a second attachment circuit that forms a multi-homed, Ethernet segment with the first attachment circuit; and
    outputting a control plane routing protocol message from the first MPLS edge switch to at least one other MPLS edge switch within the provider network, wherein the routing protocol message announces the MAC address of the customer device and an identifier for the Ethernet segment on which the L2 communication was received.

2. The method of claim 1, further comprising:
    exchanging MPLS packets between the plurality of MPLS edge switches to transport L2 communications for the customer networks through the service provider network,
    wherein exchanging MPLS packets comprises controlling the forwarding of the packets within the service provider network in response to the control plane routing message that announced the MAC address for the customer device and the identifier for the Ethernet segment.

3. The method of claim 2, wherein controlling the forwarding comprises load-balancing L2 communications destined for the MAC address of the customer device between the first MPLS edge switch and the second MPLS edge switch that are connected to the first customer network via the multi-homed Ethernet segment.

4. The method of claim 1, further comprising:
    providing a plurality of VPN instances with the MPLS edge switches; and
    assigning a different route distinguisher to each of the VPN instances.

5. The method of claim 1, wherein the routing protocol message output by the first MPLS edge switch comprises an auto discovery route that specifies one or more Ethernet tags used on the Ethernet segment to provide the multi-homed connectivity to the first one of the customer networks.

6. The method of claim 5, further comprising, based on the auto discovery route, electing one of the first and second MPLS edge switches coupled to the Ethernet segment as a designated forwarder for the multi-homed customer network.

7. The method of claim 6, further comprising setting a Route-Distinguisher (RD) of the auto discover route to an RD value assigned to an MAC-VPN instance on the first MPLS edge switch.

8. The method of claim 6, wherein electing a designator forwarder comprises electing a designator forwarder for each of a plurality of Ethernet tags associated with the Ethernet segment as specified in one or more of the auto discover routes advertised in accordance with the routing protocol,
    wherein each of the designated forwarders is responsible for flooding unknown unicast traffic associated with the respective Ethernet tag for the Ethernet segment.

9. The method of claim 1, wherein the routing protocol message further advertises an MPLS label in association with the MAC address for the customer device to be used by the MPLS switches to forward MPLS encapsulated Ethernet packets to the first MPLS switch when the encapsulated Ethernet packets have a destination MAC address that matches the MAC address for the customer device.

10. The method of claim 1, further comprising outputting a second routing protocol message that specifies a multicast Ethernet Tag route to control forwarding of multicast L2 communications associated with the first customer network, the multicast Ethernet Tag route having reachability information configured to specify:
    a Route-Distinguisher (RD) value assigned to an MAC-VPN instance on the first MPLS edge switch;
    the Ethernet segment identifier that defines the Ethernet segment that provides multi-homed connectivity between the first customer network and the first and second MPLS edge switches; and
    an Ethernet tag field that specifies one or more Ethernet Tags used on the Ethernet segment for the MAC-VPN instance.

11. The method of claim 10, wherein the Inclusive Multicast Ethernet Tag route carries a PMSI Tunnel Attribute that identifies a provider tunnel used for tunneling through the service provider network broadcast, unknown unicast or multicast traffic sent by the customer devices.

12. The method of claim 11, further comprising:
    receiving from the customer device an L2 packet at the first MPLS edge switch; and
    when the packet comprises unknown unicast traffic, flooding the packet to the other MPLS edge switches in the MAC-VPN instance by replicating the packet one or more times to form one or more replicated packets to be communicated to each remote MPLS edge switch, wherein each of the replicated packets is encapsulated with an MPLS label advertised by the corresponding remote MPLS edge switch by the PMSI Tunnel Attribute in the Multicast Ethernet Tag route for a particular combination of an Ethernet segment and Ethernet Tag specified in the advertised route.

13. The method of claim 1, further comprising performing split horizon flooding in which the first and second of MPLS edge switches do not forward broadcast, unknown unicast or multicast Ethernet traffic from the provider network for the L2 VPN to each other when the routing protocol message indicates that the first and second MPLS switches are coupled to the same client network via the Ethernet segment.

14. The method of claim 13, further comprising outputting a second routing protocol message from the first MPLS edge switch to the second MPLS switch connected to the same Ethernet segment, wherein the second routing protocol message specifies an Ethernet Segment route having reachability information configured to specify:

a Route-Distinguisher (RD) value assigned to an MAC-VPN instance on the first MPLS edge switch;

the Ethernet segment identifier for the Ethernet segment that provides multi homed connectivity between the customer network and the first and second MPLS edge switch; and an MPLS label to be used when forwarding network L2 communications for the MAC-VPN instance through the service provider to the first MPLS edge switch when the L2 communications are received from the customer network via the Ethernet segment identified by the Ethernet segment identifier.

15. The method of claim 1, further comprising:

receiving from the customer device an L2 communication at the MPLS edge switch; and encapsulating the L2 packet in an inner MPLS label advertised in an Ethernet Segment route and an outer MPLS label advertised in an Ethernet Tag route, wherein the inner MPLS label identifies to the Ethernet segment on which the L2 packet was received, and wherein the outer MPLS label identifies an Ethernet tag of the L2 packet when the L2 packet was received.

16. The method of claim 1, further comprising:

executing a Link Aggregation Control Protocol (LACP) to bundle the first and second attachment circuits as a single logical link of a link aggregation group; and calculating the Ethernet segment identifier from one or more attributes of the link aggregation group.

17. The method of claim 1, further comprising:

snooping on bridge protocol data units (BPDUs) for a spanning tree protocol on the Ethernet segment; and calculating the Ethernet segment identifier from one or more attributes of the spanning tree protocol.

18. A multi-protocol label switching (MPLS) edge switch comprising:

a first interface that couples the MPLS edge switch to an attachment circuit of a first one of a plurality of customer networks, wherein the attachment circuit carries a layer two (L2) communication that includes a media access control (MAC) address for a customer device within the first customer network, and wherein the attachment circuit is one of a plurality of attachment circuits that forms an active-active, multi-homed Ethernet segment that connects the customer network to a service provider network;

a second interface that couples the MPLS edge switch to the service provider network having a plurality of remote MPLS edge switches that provide an L2 virtual private network (VPN) for the customer network;

a control unit having a processor programmed to output a routing protocol message from the MPLS edge switch to the remote MPLS edge switches within the provider network, wherein the routing protocol message announces the MAC address of the customer device and an identifier for the Ethernet segment on which the L2 communication was received; and a switching element programmed to switch L2 communications between the attachment circuit of the network device and the L2 VPN of the service provider network.

19. The network device of claim 18, wherein the routing protocol message further specifies an MPLS label in association with the MAC address for the customer device to be used by the remote MPLS switches to forward MPLS encapsulated Ethernet packets through the service provider network to the MPLS switch when the encapsulated Ethernet packets have a destination MAC address that matches the MAC address for the customer device.

20. The network device of claim 18, wherein the processor of the control unit is programmed to output a second routing protocol message that specifies a multicast Ethernet Tag route to control forwarding of multicast L2 communications associated with the first customer network, the multicast Ethernet Tag route having reachability information configured to specify:

a Route-Distinguisher (RD) value assigned to an MAC-VPN instance on the first MPLS edge switch;

the Ethernet segment identifier that defines the Ethernet segment that provides multi-homed connectivity for the customer network; and an Ethernet tag field that specifies one or more Ethernet Tags used on the Ethernet segment for the MAC-VPN instance.

21. The network device of claim 18, wherein the processor of the control unit is programmed to perform split horizon flooding in which the MPLS edge switch does not forward broadcast, unknown unicast or multicast Ethernet traffic from the provider network for the L2 VPN to other ones of the remote MPLS switches when routing protocol message from the other ones of the remote MPLS switches carrying an Ethernet segment identifier that indicates that the first and second MPLS switches are coupled to the same client network via the Ethernet segment.

22. The network device of claim 21, wherein the processor of the control unit is programmed to output a second routing protocol message from the first MPLS edge switch to the second MPLS switch connected to the same Ethernet segment, wherein the second routing protocol message specifies an Ethernet Segment route having reachability information configured to specify:

a Route-Distinguisher (RD) value assigned to an MAC-VPN instance on the first MPLS edge switch;

the Ethernet segment identifier for the Ethernet segment that provides multi homed connectivity for the customer network; and an MPLS label to be used when forwarding network L2 communications for the MAC-VPN instance through the service provider to the first MPLS edge switch when the L2 communications are received from the customer network via the Ethernet segment identified by the Ethernet segment identifier.

23. The network device of claim 18, wherein the processor of the control unit is programmed to execute a Link Aggregation Control Protocol (LACP) to bundle the first and second attachment circuits as a single logical link of a link aggregation group, wherein the processor calculates the Ethernet segment identifier from one or more attributes of the link aggregation group.

24. The network device of claim 18, wherein the processor of the control unit is programmed to snoop on bridge protocol data units (BPDUs) for a spanning tree protocol on the Ethernet segment; and wherein the processor calculates the Ethernet segment identifier from one or more attributes of the spanning tree protocol.

* * * * *